United States Patent [19]

Kim

[11] Patent Number: 4,687,080
[45] Date of Patent: Aug. 18, 1987

[54] CLUTCH BRAKE METHOD

[76] Inventor: Yeon K. Kim, 243-17 (12/4) Huksukdong, Dongjak-Ku, Seoul, Rep. of Korea, 151

[21] Appl. No.: 860,221

[22] PCT Filed: Jun. 27, 1985

[86] PCT No.: PCT/KR85/00015
§ 371 Date: Mar. 25, 1986
§ 102(e) Date: Aug. 25, 1986

[87] PCT Pub. No.: WO86/01163
PCT Pub. Date: Feb. 27, 1986

[30] Foreign Application Priority Data

Aug. 10, 1984 [KR] Rep. of Korea ............... 84-4781

[51] Int. Cl.⁴ ............... B60K 41/24; B60K 41/28
[52] U.S. Cl. ............... 192/13 A; 192/0.094; 192/3 TR; 192/4 A
[58] Field of Search ............... 192/0.049, 3 H, 3 TR, 192/4 A, 13 A, 0.072, 0.094

[56] References Cited

U.S. PATENT DOCUMENTS

| | | | |
|---|---|---|---|
| 2,325,771 | 8/1943 | Hemphill | 192/3 TR |
| 3,322,246 | 5/1967 | Noguchi | 192/13 A X |
| 3,705,643 | 12/1972 | Iwaoka et al. | |
| 4,540,072 | 9/1985 | Suzuki et al. | 192/4 A |
| 4,553,651 | 11/1985 | Gaiser et al. | 192/13 A |

FOREIGN PATENT DOCUMENTS

| | | |
|---|---|---|
| 1530662 | 4/1969 | Fed. Rep. of Germany . |
| 1192061 | 4/1985 | Fed. Rep. of Germany . |
| 796802 | 12/1980 | Rep. of Korea . |
| 1197737 | 7/1970 | United Kingdom . |
| 2122709 | 1/1984 | United Kingdom . |

OTHER PUBLICATIONS

International Search Report PCT/KR 85/00015, dated 09/04/85 Austrian Patent Office.

Primary Examiner—George H. Krizmanich
Attorney, Agent, or Firm—Holman & Stern

[57] ABSTRACT

A clutch-actuated brake pressure-applying device comprises a housing having a cylinder and piston therein, a piston rod connectable to the clutch pedal rod of a conventional clutch mechanism of a vehicle, float channels through the housing and piston for facilitating the application of braking pressure from the master cylinder outlet to the individual wheel cylinders, and a disc valve within the piston operable to control the brake pressure applied through the device to the wheel cylinders so that during normal operation, braking pressure is applied solely by the brake pedal and that upon actuation of the clutch pedal the braking pressure is applied through the piston and channels to the wheel cylinders, and upon release of the brake pedal the brake pressure is maintained by the clutch pedal in the depressed position with the clutch disengaged.

9 Claims, 11 Drawing Figures

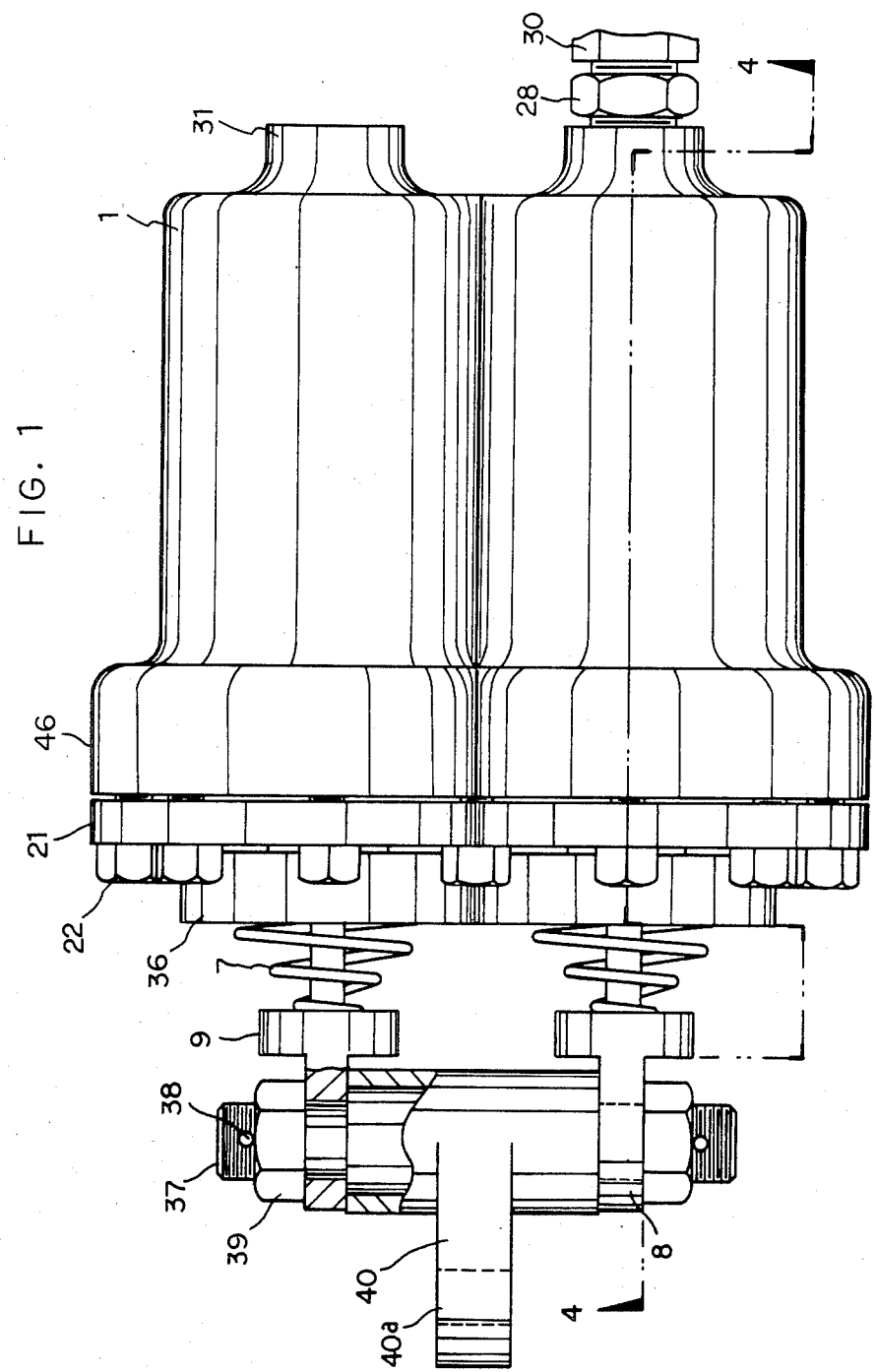

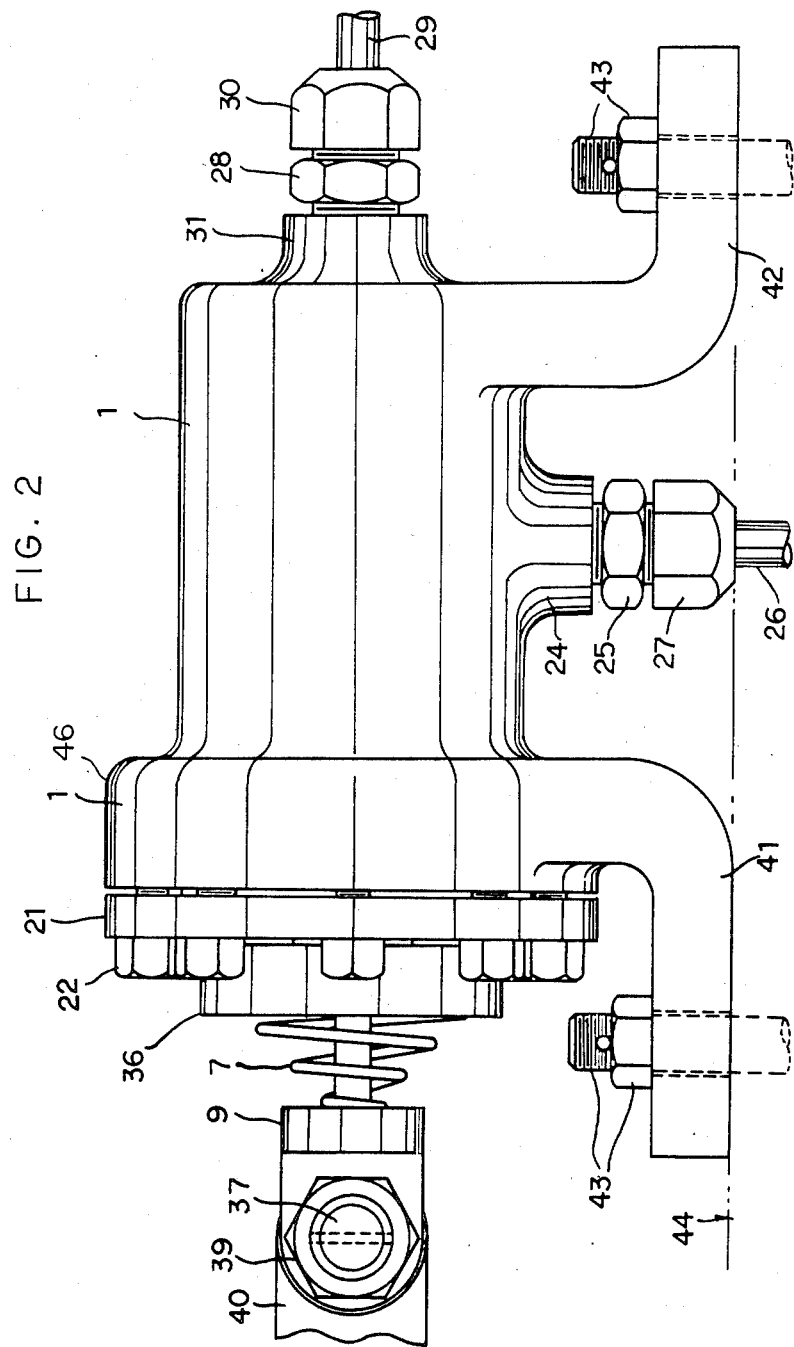

CLUTCH BRAKE METHOD

CROSS REFERENCE TO RELATED APPLICATION(S)

This U.S. application stems from PCT International Application No. PCT/KR85/00015 filed June 27, 1985.

BACKGROUND OF THE INVENTION

1. Field of the Invention

This invention relates to the brake systems of vehicles.

2. Description of the Prior Art

There has been no device yet invented to keep a vehicle in a safely braked position through automatic linkage within a driving mechanism from the time when the vehicle is stopped until it is restarted (forward or backward) by a device between the brake pedal and clutch pedal. For example, a vehicle equipped with a clutch device will be totally out-of-braking position during the time the driver moves his right foot from the brake pedal to the accelerator pedal releasing simultaneously the clutch pedal.

Of course, a hand brake can keep the vehicle in a braked position at that moment, but a hand brake often does not work satisfactorily on a slope. The use of the hand brake at such time is less efficient and inconvenient. The absence of a reliable, safe device can cause incidents at present as follows:

(1) The vehicle can move backward or stop working on an upward slope, which may cause traffic accidents.

(2) In case a vehicle is hit by a following vehicle when it is about to restart after stopping on a level or a downward slope, it may rush forward and hit other vehicles or pedestrians because the driver removes his foot from the brake pedal while his left foot is not released from the clutch pedal and the vehicle is released from the brake system. This may cause a major traffic accident.

BRIEF SUMMARY OF THE INVENTION

The object of this invention, therefore, is to secure safe operation of vehicles, to make the vehicles easier to control and therefore make drivers feel free from mental stress and accidents.

This object is achieved by the invention which operates so that when a vehicle is brought to a stop by pressing the brake pedal, the brake pressure is automatically and simultaneously transmitted to the clutch system by pressing the clutch pedal. The braking pressure which has been transmitted to the clutch pedal is reduced slowly as the clutch pedal is released and the accelerator pedal is pushed down when the car is restarted. The car will then move forward without any risk of backward movement.

Since the clutch pedal immediately takes over the role of the brake pedal in the above described action, the vehicle will be kept in a completely braked situation even if the brake pedal is released, until the vehicle starts to move forward from a stopped situation.

Pushing down and releasing the clutch pedal for speed change while the vehicle is running does not act on the brake system.

Pushing down the brake pedal to reduce speed while the vehicle is moving does not act on the clutch system.

Only when the action of pushing down the brake pedal for speed reduction or for stopping is done together with the action of pushing down the clutch pedal, regardless of the order of or time interval between the two actions, pressure of the same amount as applied to the brakes by the brake pedal is automatically transmitted by the clutch pedal. Therefore, even if the driver releases the brake pedal before he releases the clutch pedal, the pressure of the same amount as applied by the brake pedal is still applied by the clutch pedal until release of the clutch pedal.

As described in detail hereinafter, this invention is intended to keep a vehicle from being out of the driver's control at any moment while it is being driven. This invention will give the following benefits both to the vehicle and to the driver:

Completely prevent an automobile from moving unintentionally backward at the moment the driver attempts to start on an upward slope; it also will allow the driver to proceed smoothly.

Especially under rainy, snowy or icy road conditions, this ability to prevent unintentional backward movement will greatly contribute to safe vehicle operation free from damage by accident.

The automatic system of this invention described above will assure easier and safer driving conditions especially for unskilled drivers.

These benefits will be greater for vehicles carrying heavy cargo.

BRIEF DESCRIPTION OF THE DRAWINGS

The invention will now be described in greater detail with reference to the accompanying drawings wherein:

FIG. 1 is a top plan view of the device of the invention;

FIG. 2 is a side elevational view of the device of FIG. 1;

DETAILED DESCRIPTION

Figure 3A:
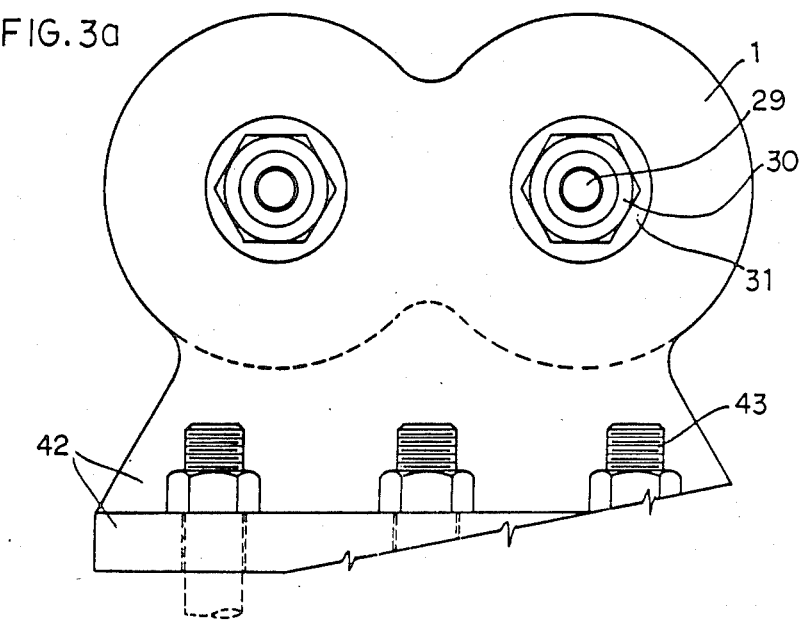
FIG. 3a is a front elevational view of the device of FIG. 1.
Figure 3B:
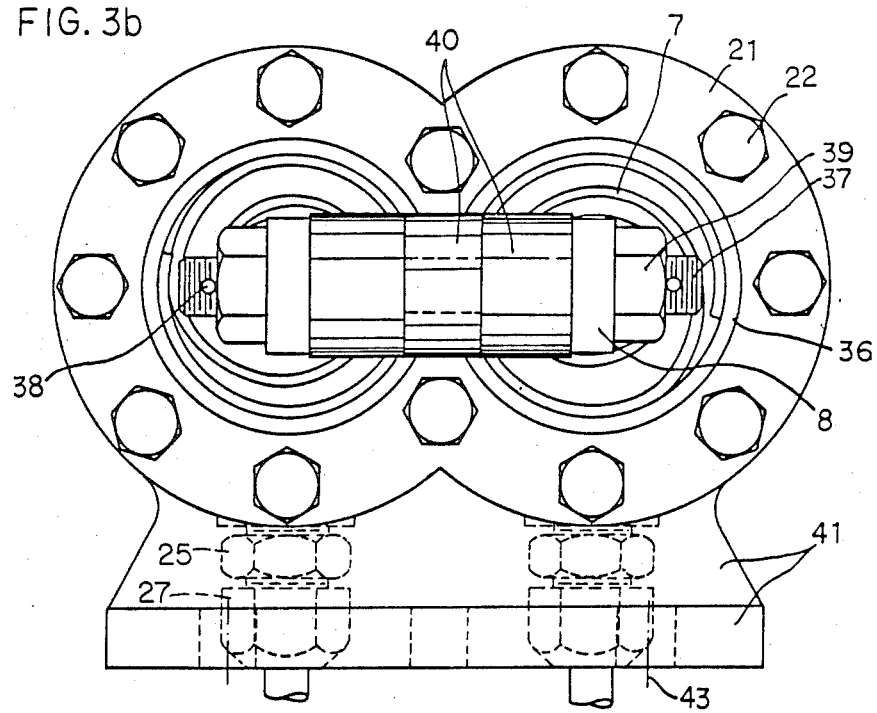
FIG. 3b is a rear elevational view of the device of FIG. 1.

The drawings attached herewith are prepared only for the description of this device. Therefore, the dimensions of this device may be adjusted depending on the size of the braking pressure pipe of the vehicle.

The device can be applied both to hydraulic braking systems and to pneumatic braking systems.

The device can be applied independently either to the front wheel braking system or to the rear wheel braking system. Therefore, this device makes it possible to brake both the front wheels and rear wheels even when it is attached to a vehicle which does not have separate braking systems.

The device can be installed in parallel or in series fluid circuits.

The device is to be installed next to the brake master cylinder.

FIG. 1 is a top plan view of the device of this invention showing the body, or housing, member 1 having dual cylinders therein, only one of which will be described in detail and shown in FIGS. 4 through 7. As shown in FIG. 2, housing 1 has front and rear support, or mounting, legs 42 and 41, respectively, which are attached by bolt-and-nut assemblies 43 extending through holes in the legs 42, 41 to the frame of an automobile shown schematically at 44.

Each cylinder 45 within housing 1 has slidably mounted therein in the usual manner a piston 2 having suitable ring grooves therein for receiving piston rings 4 in spaced relationship and near the opposite ends of the piston.

The front and bottom parts of housing 1 have bosses 31 and 24, respectively, for receiving pipe connectors of the fluid pipelines as will more clearly be described below. The rear end of housing 1 has an enlarged boss 46 having screw-threaded holes 47 therein for cooperatively receiving mounting bolts 22 for attaching cover plate 21 to the rear end of the housing.

The rear or end cover plate 21, attached to housing 1 by bolts 22, has suitable holes drilled therethrough for receiving bolts 22 and an inner cylindrical boss portion 21a projecting into and engaging with the open end of cylinder 45. A suitable gasket 6 is provided between the outer end surface of housing 1 and member 21 to seal the cylinder. Member 21 also has a counterbore 21b for receiving a boss portion of the spring support and closing plate 36 and a gasket 20 is provided between these two members to seal the interface therebetween. A clutch pressing bar, or piston rod 5, passes through aligned holes in members 36 and 21 and has a threaded portion on the inner end 5a (best shown in FIG. 6) for engaging in a threaded hole in piston 4 and has a lock nut 6 thereon engaged with screw thread 5a for locking pressing bar 5 to the piston. The outer end of pressing bar 5 has a radial flange 9 thereon and an axial connecting flange 8 projecting outwardly from radial flange 9 having a hole 10 therethrough for receiving a connecting pin 37 extending from the end of connector 40 adapted to be connected to the outer end of the clutch pedal actuating rod (not shown) by a suitable hole 40a which receives a suitable connecting pin or bolt means (not shown) so that actuation of the clutch pedal in turn actuates via connector 40 the piston rod 5 and piston 2, as will be clearly understood by one skilled in this art. A return spring 7 is provided between closure plate 36 and flange 9 for returning the piston 2 to the normal position when the clutch is disengaged.

In the embodiment shown, a dual piston assembly is provided and therefore connecting member 40 has connecting pins 37 extending from opposite ends thereof transversely to the central axes of the dual cylinders and pistons and the outer portions of connecting pins 37 are screw-threaded to receive locking or retaining nuts 39 for retaining outer flange portion 8 on connecting member 40. Suitable retaining pin holes 38 may be provided through connecting pins 37 for receiving a retaining means (not shown) for the nuts 39. Screws or bolts 23 engage through suitable holes in closure plate 36 and engage in cooperating screw threads in cover plate 21 for securing closure plate 36 to cover plate 21. Pressure inlet pipe 26 from the pressure outlet of the master cylinder of the brake system (not shown) is connected to connecting boss 24 on housing 21 by a suitable pressure pipe nipple 25 and tightening or lock nut 27 so that the brake fluid flows into the housing through pipe 26 and pressure fluid inlet hole 51 into cylinder 45. A pressure fluid outlet pipe 29 is similarly connected to connecting boss 31 on housing 1 by pressure pipe connecting nipple 28 and tightening or lock nut 30. Hole 52 is provided through the front end of housing 1 to connect cylinder 45 with outlet pipe 29.

Figure 7A:
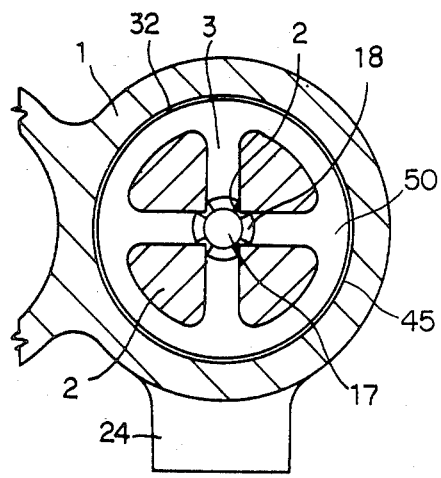
FIG. 7a is a cross-sectional view taken along line 7A—7A of FIG. 4.
Figure 7B:
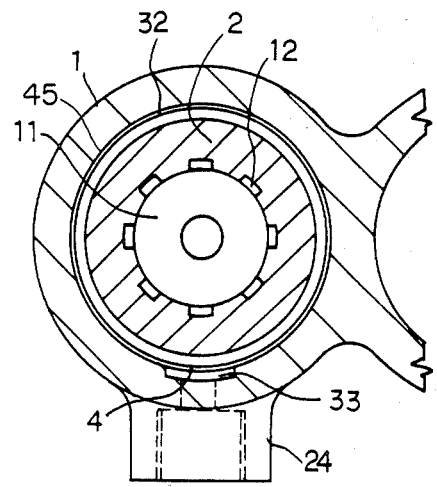
FIG. 7b is a cross-sectional view taken along line 7B—7B of FIG. 4.

Clearance 32 is provided between cylinder 45 and piston 2 and piston 2 is slidably supported in cylinder 45 by piston rings 4. Annular peripheral groove 50 is provided on piston 2 and radial bores 3 extend through piston 2 and intersect in the central region thereof and communicate at their radially outer ends with annular groove 50 (as best shown in FIG. 7a). Fluid pressure spaces in the form of axially extending grooves or slots 18 extend through piston 2 from, and in communication with, the radially inner ends of bores 30 towards the forward end of piston 2 where they communicate with cylinder chamber 53 in which is slidably-operating disc valve 11 having valve shaft or guide bar 17 slidably operating in an axially extending hole in piston 2. The axial grooves or slots 18 surround valve shaft 17 for providing the flow channels for brake fluid between radial bores 30 and chamber 53. Annular seal ring 16 is provided in piston 2 at the inner end of chamber 53 for sealing engagement with the rear face of disc valve 11 for a purpose which will be more clearly understood from the continuing description below.

Figure 4:
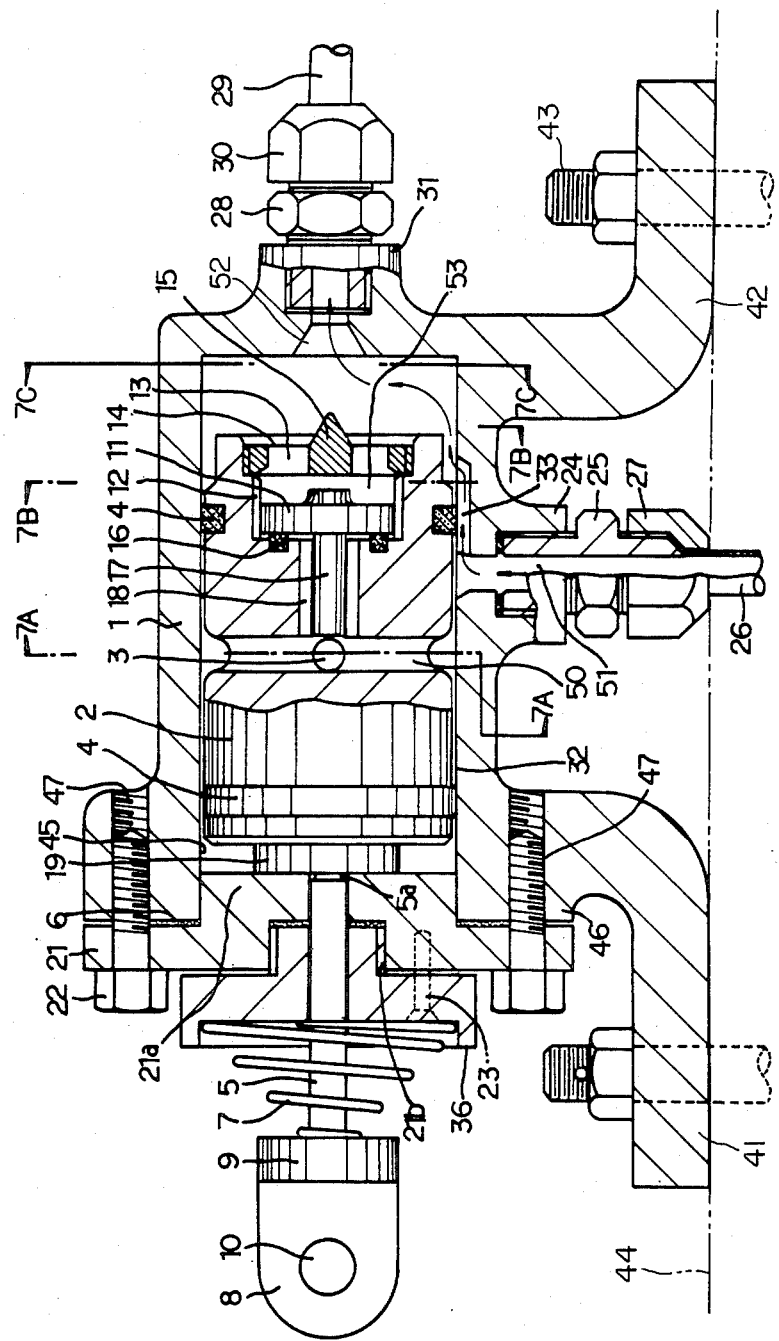
FIG. 4 is a cross-sectional view taken along line 4—4 of FIG. 1 showing brake operation while the clutch pedal is not operating.

Further flow passages 12 for brake fluid are provided in the cylinder wall of chamber 53 for communicating between the opposite faces of disc valve 11. A further flow passage 33 is provided in housing 1 extending from pressure fluid inlet hole 51 toward the front end of the housing for a sufficient distance to allow fluid pressure transmission from inlet pipe 26 directly into the forward end of cylinder 45 bypassing piston 2 (as best shown in FIG. 4) during normal operation of the brake system with the clutch engaged.

Figure 6:
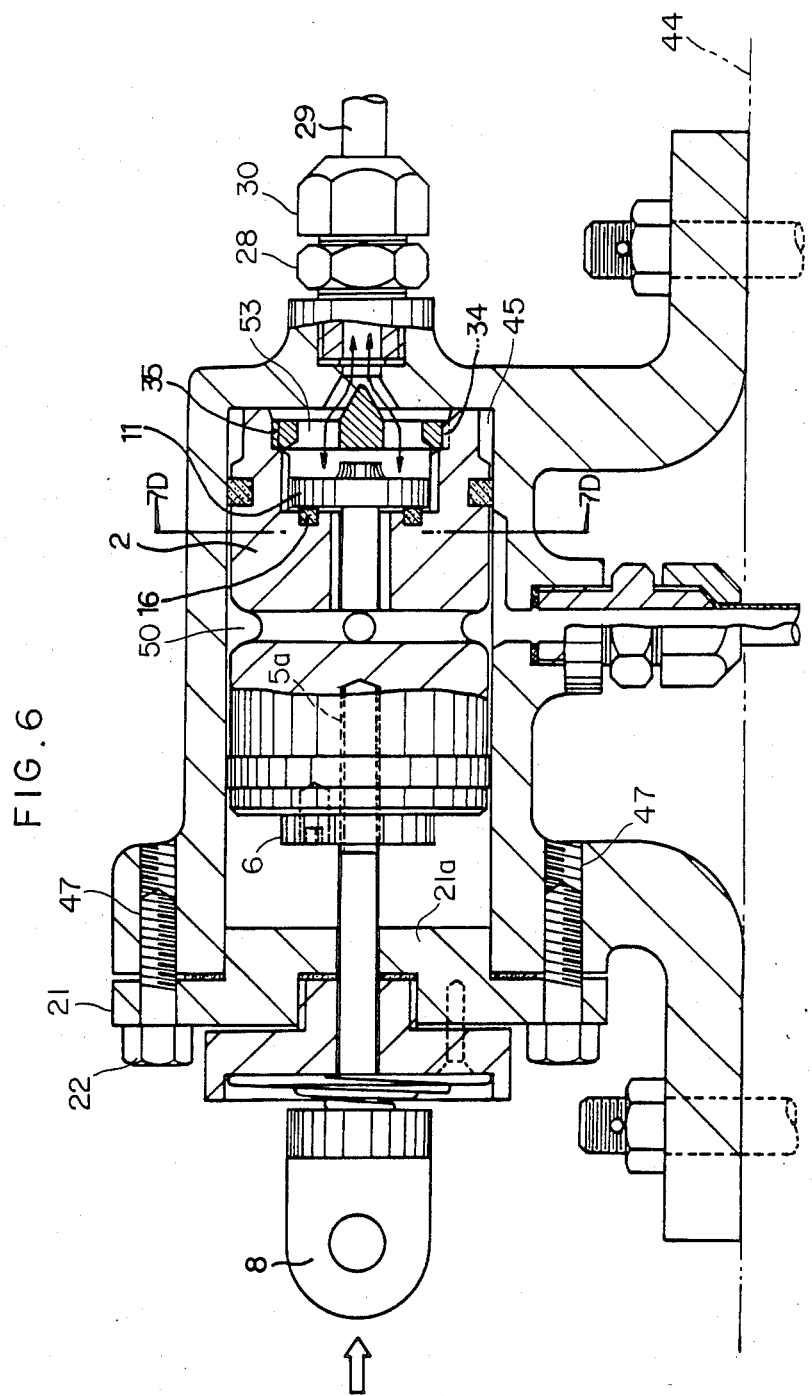
FIG. 6 is a view similar to FIG. 4 showing brake operation when the clutch is in the fully disengaged position.
Figure 7C:
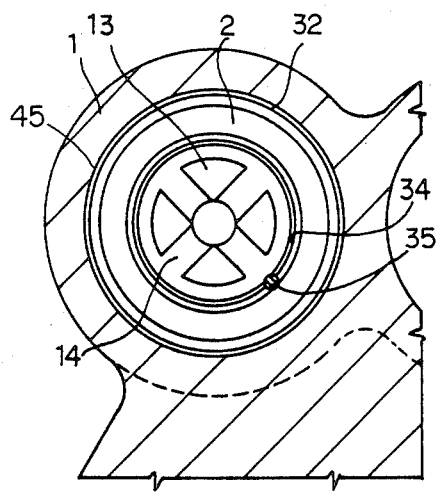
FIG. 7c a cross-sectional view taken along line 7C—7C of FIG. 4.
Figure 7D:
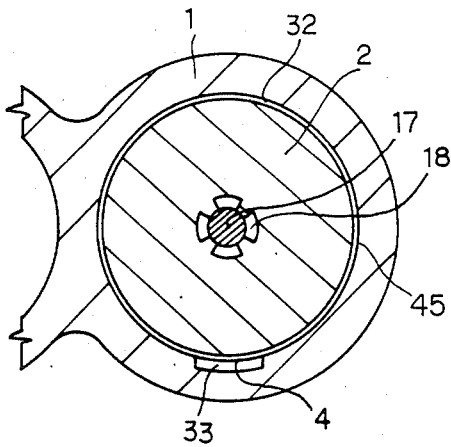
FIG. 7d is a cross-sectional view taken along line 7D—7D of FIG. 6.

In the forward end portion of piston 2 there is provided a disc valve stopper 15 in the form of a ring-shaped element having spokes 14 to provide fluid pressure flow channels 13 through the stopper. A central stopper portion is supported at the inner ends of spokes 14 and has a pointed end thereon facing toward the front end of the assembly. The stopper is mounted within a further counterbore in the forward end of piston 2 by a suitable means such as a screw-driven part 34 and a lock screw 35 (as best shown in FIGS. 6 and 7c).

Figure 5:
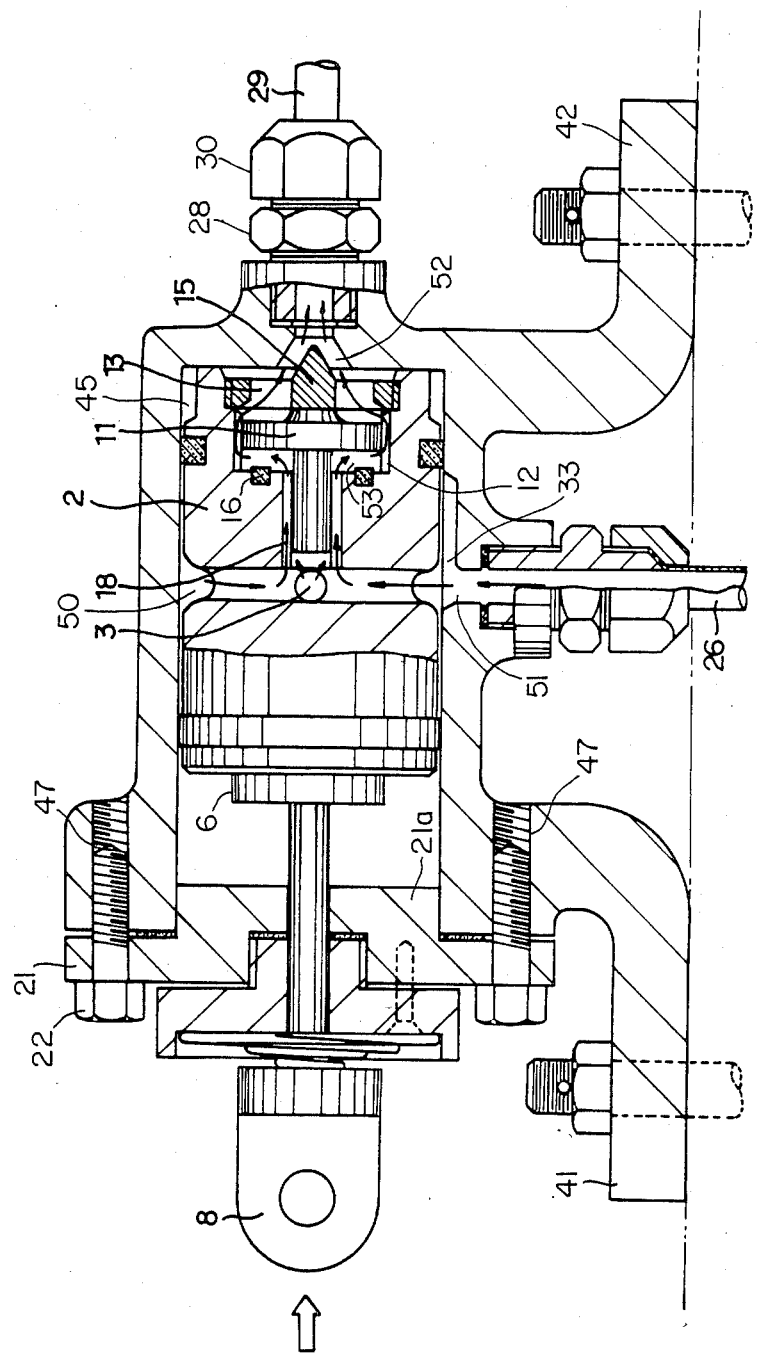
FIG. 5 is a view similar to FIG. 4 showing brake operation while the clutch is being disengaged.

The operation of the device will now be described. FIG. 4 shows the device in the normal operating position with the clutch engaged (clutch pedal released) so that the piston is in the left-most position, as shown in FIG. 4, being urged into this position by return spring 7. In this position, when the brake pedal is actuated, fluid pressure through the brake fluid is transmitted through pipe 26, hole 51, flow channel 33, cylinder 45, outlet hole 52 and outlet pipe 29 to the wheel cylinders on the front and rear wheels of the vehicle. When the clutch is now actuated by pressing the clutch pedal in the direction of the arrow at the left of connector flange 8, as shown in FIGS. 5 and 6, piston shaft 5 is urged to the right against the force of spring 7 and moves piston 2 toward the front end of of cylinder 45 into the position shown in FIG. 5 where peripheral groove 50 communicates with inlet hole 51 so that fluid pressure is transmitted through radial channels 3, axial channels 18, chamber 53, axial channels 12, passages 13, outlet hole 52 and outlet pipe 29 to the wheel cylinders. During this phase of the operation, however, the fluid pressure moves disc valve 11 toward the front end of the device (to the right) so that the rear face thereof disengages with sealing ring 16 to allow fluid pressure to pass through channels 12 to the wheel cylinders as shown by the arrows in FIG. 5. When the brake pedal is now released with the clutch still disengaged so that piston 2 remains in the forward position, disc valve 11 immediately shifts rearwardly (to the left) as shown in FIG. 6 so that the rear face thereof sealingly engages against seal 16 to prevent backward flow or release of the brake fluid pressure on the wheel cylinders, whereby the clutch pedal solely controls the braking pressure on the wheels and the car remains in the braked position as long as the clutch pedal is depressed and the clutch is in a disengaged position. Upon release of the clutch pedal, return spring 7 moves piston 2 rearwardly (to the left as shown in the figures) to the normal position shown in FIG. 4.

Although the clutch pedal load required to operate the invention is minor, this load can further be minimized through the mechanism which connects 40 to the clutch pedal bar.

From the above description, it will be readily seen that the device of this invention completely excludes the requirement for any electrical device using electric power. Moreover, the mechanism of the invention may be produced by the precision-machinery industry. Furthermore, the invention of this device can also be installed in existing vehicles as will be understood by one familiar with the art.

I claim:

1. A clutch actuated brake device, for use on a vehicle having a fluid operated brake system and a separate clutch actuator for engaging and disengaging the clutch, comprising:
   a housing member;
   a cylinder in said housing;
   a control piston slidably mounted in said cylinder for movement between a braking position and a non-braking position;
   means for connecting said control piston to said clutch actuator for displacing said control piston from said non-braking position to said braking position when said clutch actuator is moved to disengage said clutch;
   means for returning said control piston to said non-braking position when said clutch actuator is returned to the clutch-engaged position;
   an inlet for brake fluid in said housing communicating with said cylinder, said brake fluid in said inlet being pressurized when the brakes are initially applied;
   an outlet for said brake fluid communicating with said cylinder;
   a first passage means in said housing for communicating said inlet with said outlet when said control piston is in said non-braking position;
   second passage means in said control piston communicating said inlet with said outlet when said control piston is in said braking position; and
   valve means in said second passage means movable by brake fluid pressure between open and closed positions for controlling transmission of pressure in the brake fluid through said second passage means;
   so that when said clutch actuator is in the clutch-disengaging position and said brake fluid in said inlet is pressurized, said control piston is in said braking position and said valve means is urged by brake fluid pressure from said inlet into said open position for applying said brakes, and when said pressure in said inlet is released with said clutch actuator in the clutch-disengaging position, said valve means is moved into said closed position by brake fluid pressure from said outlet for maintaining application of the brakes by brake-pressure controlled solely by said clutch actuator.

2. A brake device as claimed in claim 1 wherein:
   said first passage means comprises a fluid flow channel having a first end communicating with said brake fluid inlet and a second end communicating with said cylinder through the cylinder wall at a position between said control piston and said outlet when said piston is in said non-braking position and where said control piston closes said channel at said second end when said cotnrol piston is in said braking position.

3. A brake device as claimed in claim 1 wherein:
   said second passage means comprises a peripheral groove in said control piston, at least one radial channel in said control piston communicating at the outer end thereof with said peripheral groove, and axially extending channel means communicating said at least one radial channel with said cylinder, said peripheral groove being positioned in said control piston for communication with said inlet when said control piston is in said braking position.

4. A brake device as claimed in claim 2 wherein:
   said second passage means comprise a peripheral groove in said control piston, at least one radial channel in said control piston communicating at the outer end thereof with said ppripheral groove, and axially extending channel means communicating said at least one radial channel with said cylinder, said peripheral groove being positioned in said control piston for communication with said inlet when said control piston is in said braking position.

5. A brake device as claimed in claim 1 wherein said valve means comprise:
   a disc valve member slidable axially in a valve chamber in said control piston, and a valve seat in said control piston engageable with one side of said disc valve member when said valve means is in said closed position.

6. A brake device as claimed in claim 4 wherein said valve means comprise:
   a disc valve member slidable axially in a valve chamber in said control piston, and a valve seat in said control piston engageable with one side of said disc valve member when said valve means is in said closed position.

7. A brake device as claimed in claim 5 wherein:
   said axially extending channel means comprises an axial bore in said control piston and circumferentially spaced grooves extending radially from said bore; and
   an axially extending stem is provided on said disc valve member slidably supported in said bore.

8. A brake device as claimed in claim 6 wherein:
   said axially extending channel means comprises an axial bore in said control piston and circumferentially spaced grooves extending radially from said bore; and an axially extending stem is provided on said disc valve member slidably supported in said bore.

9. A method of operating a clutch brake for a vehicle having a brake pedal and hydraulic brake fluid system and a clutch pedal for engaging and disengaging a clutch comprising:

applying brake fluid pressure by said brake pedal to the inlet of a cylinder having a piston therein operated by the clutch pedal and an outlet communicating with the brake system;

bypassing said brake fluid pressure around the piston to the outlet when the clutch pedal is in the clutch-engaging position;

stopping said bypassing and directing said brake fluid pressure through passageway in the piston to the outlet when the clutch pedal is in the clutch-disengaging position; and closing the passageway in the piston by back pressure from the outlet when the brake pedal is released and the clutch pedal remains in the clutch-engaging position for maintaining brake fluid pressure in the system solely by the clutch pedal.

* * * * *